(12) United States Patent
Busch et al.

(10) Patent No.: US 7,762,761 B2
(45) Date of Patent: Jul. 27, 2010

(54) METHODS AND APPARATUS FOR ASSEMBLING TURBINE NOZZLES

(75) Inventors: Duane Busch, Loveland, OH (US); Andrew Charles Powis, Madeira, OH (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 11/290,010

(22) Filed: Nov. 30, 2005

(65) Prior Publication Data

US 2007/0122275 A1    May 31, 2007

(51) Int. Cl.
*F01D 9/00*    (2006.01)
(52) U.S. Cl. .................... 415/1; 415/191; 415/209.3
(58) Field of Classification Search ................. 415/191, 415/209.3, 211.2, 1
See application file for complete search history.

(56) References Cited

U.S. PATENT DOCUMENTS

| | | | | |
|---|---|---|---|---|
| 3,365,173 A | * | 1/1968 | Lynch et. al. | 415/209.3 |
| 4,017,213 A | * | 4/1977 | Przirembel | 416/97 A |
| 4,720,236 A | * | 1/1988 | Stevens | 415/136 |
| 4,897,021 A | * | 1/1990 | Chaplin et al. | 415/173.7 |
| 4,920,742 A | * | 5/1990 | Nash et al. | 60/39.32 |
| 5,174,715 A | | 12/1992 | Martin | |
| 6,200,092 B1 | | 3/2001 | Koschier | |
| 6,514,041 B1 | * | 2/2003 | Matheny et al. | 415/177 |
| 6,893,217 B2 | | 5/2005 | Brainch et al. | |
| 6,921,246 B2 | | 7/2005 | Brainch et al. | |
| 7,258,525 B2 | * | 8/2007 | Boeck | 415/209.3 |
| 7,291,946 B2 | * | 11/2007 | Clouse et al. | 310/51 |
| 7,334,306 B2 | | 2/2008 | Beverley et al. | |
| 2004/0062636 A1 | * | 4/2004 | Mazzola et al. | 415/115 |
| 2004/0120810 A1 | * | 6/2004 | Brainch et al. | 415/191 |

\* cited by examiner

*Primary Examiner*—Edward Look
*Assistant Examiner*—Aaron R Eastman
(74) *Attorney, Agent, or Firm*—William Scott Andes, Esq.; Armstrong Teasdale LLP

(57) ABSTRACT

A method for assembling a turbine nozzle for a gas turbine engine. The method includes providing a turbine nozzle including a plurality of airfoil vanes extending between an inner band and an outer band, wherein the outer band includes a forward hook assembly having a rail and at least one hook, providing at least one scalloped recessed area within the forward hook assembly at least one hook to facilitate reducing stresses induced to the turbine nozzle, and coupling the turbine nozzle into the gas turbine engine using the forward hook assembly such that the turbine nozzle is at least partially supported by the forward hook assembly.

10 Claims, 5 Drawing Sheets

METHODS AND APPARATUS FOR ASSEMBLING TURBINE NOZZLES

BACKGROUND OF THE INVENTION

This invention relates generally to gas turbine engine nozzles and more particularly, to methods and apparatus for assembling gas turbine engine nozzles.

Gas turbine engines include combustors which ignite fuel-air mixtures which are then channeled through a turbine nozzle assembly towards a turbine. At least some known turbine nozzle assemblies include a plurality of nozzles arranged circumferentially and configured as doublets. At least some known turbine nozzles include more than two circumferentially-spaced hollow airfoil vanes coupled by integrally-formed inner and outer band platforms. Specifically, the inner band forms a radially inner flowpath boundary and the outer band forms a radially outer flowpath boundary. Additionally, at least some known outer bands include a forward and an aft hook assembly that are used to couple the turbine nozzle within the engine. However, such hook assemblies may induce stresses in the turbine nozzle in areas adjacent the assembly, for example an intersection between the outer band and an airfoil vane, which may shorten a lifespan of the nozzle.

BRIEF SUMMARY OF THE INVENTION

In one aspect, a method is provided for assembling a turbine nozzle for a gas turbine engine. The method includes providing a turbine nozzle including a plurality of airfoil vanes extending between an inner band and an outer band, wherein the outer band includes a forward hook assembly having a rail and at least one hook, providing at least one scalloped recessed area within the forward hook assembly at least one hook to facilitate reducing stresses induced to the turbine nozzle, and coupling the turbine nozzle into the gas turbine engine using the forward hook assembly such that the turbine nozzle is at least partially supported by the forward hook assembly.

In another aspect of the invention, a turbine nozzle for a gas turbine engine includes an outer band comprising an inside face, an outside face, and a forward hook assembly extending outwardly from said inside face. The forward hook assembly includes a rail and at least one hook extending outwardly from the rail. The at least one hook includes at least one scalloped recessed area. The turbine nozzle also includes an inner band and at least one airfoil vane extending between the outer band and the inner band.

In another aspect, a gas turbine engine includes at least one turbine nozzle assembly including an outer band, an inner band, and a plurality of airfoil vanes coupled together by the outer and inner bands. The outer band includes a forward hook assembly extending radially outwardly from the outer band. The forward hook assembly includes a rail and at least one hook extending outwardly from the rail. The at least one hook includes at least one scalloped recessed area.

DETAILED DESCRIPTION OF THE INVENTION

Figure 1:
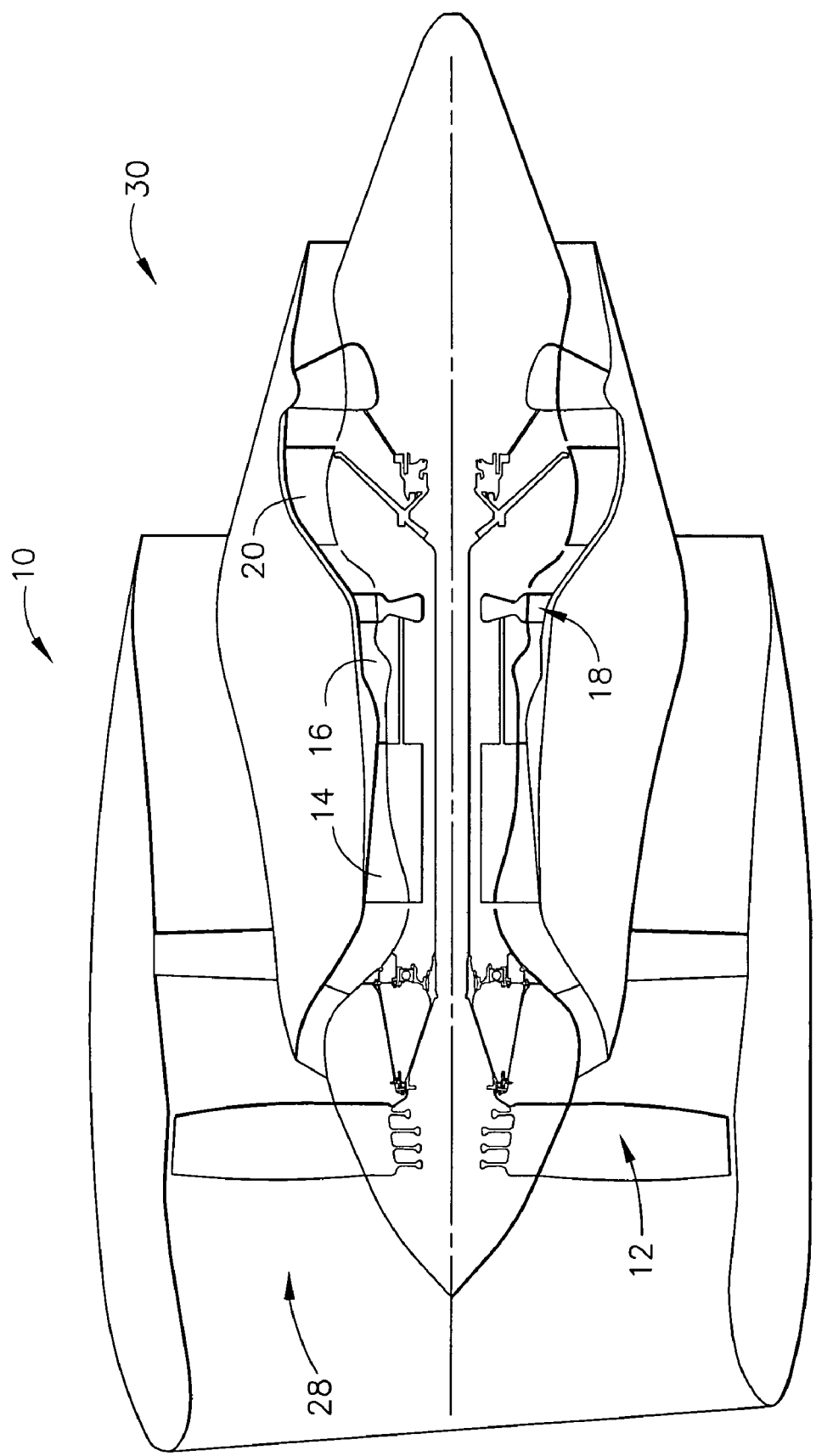
FIG. 1 is a schematic illustration of an exemplary gas turbine engine.

FIG. 1 is a schematic illustration of a gas turbine engine 10 including, in serial flow arrangement, a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 drives turbines 18 and 20, and turbine 20 drives fan assembly 12. Turbine 18 drives high-pressure compressor 14.

Figure 2:
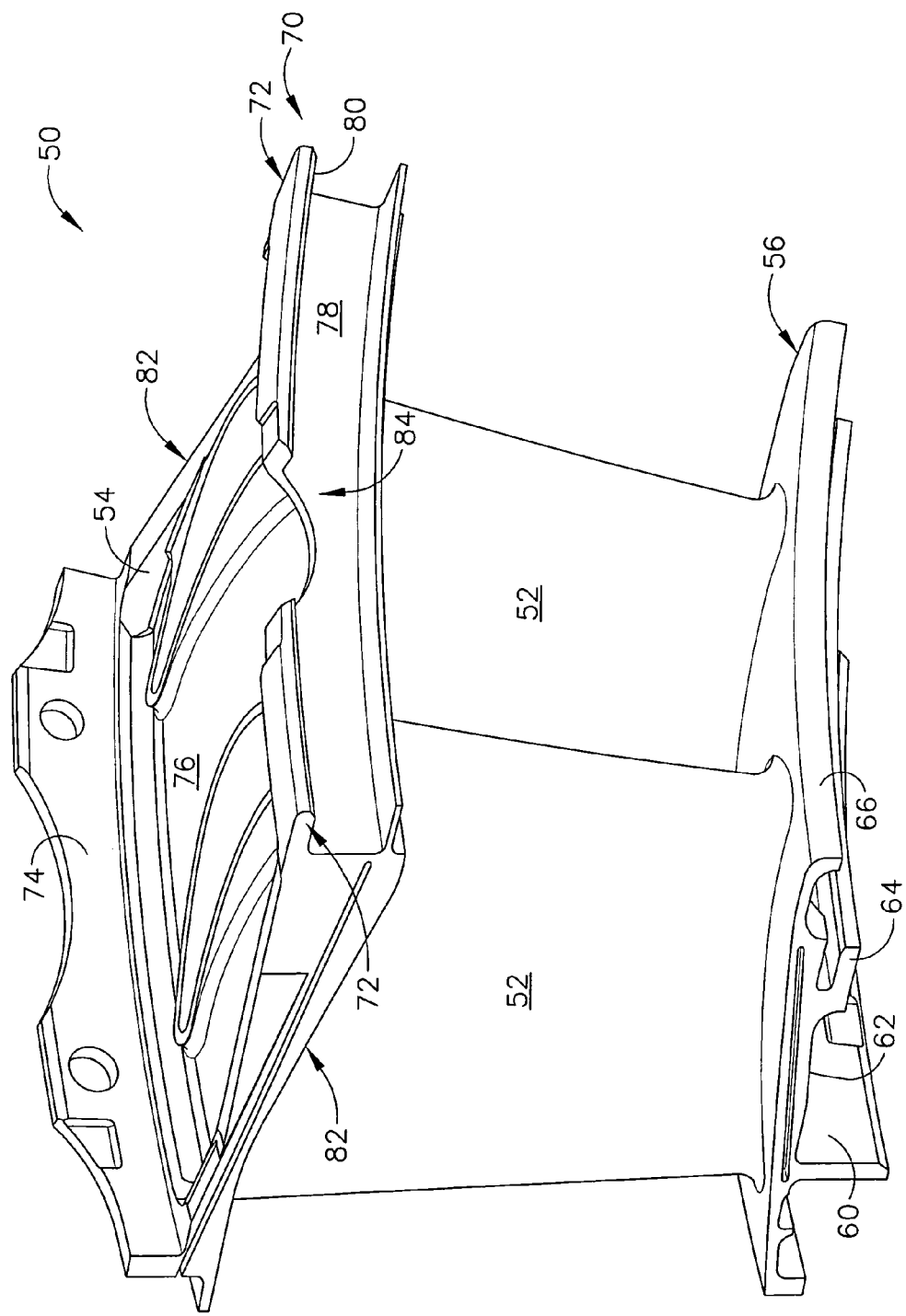
FIG. 2 is a perspective view of an exemplary embodiment of a turbine nozzle that may be used with the gas turbine engine shown in FIG. 1.
Figure 3:
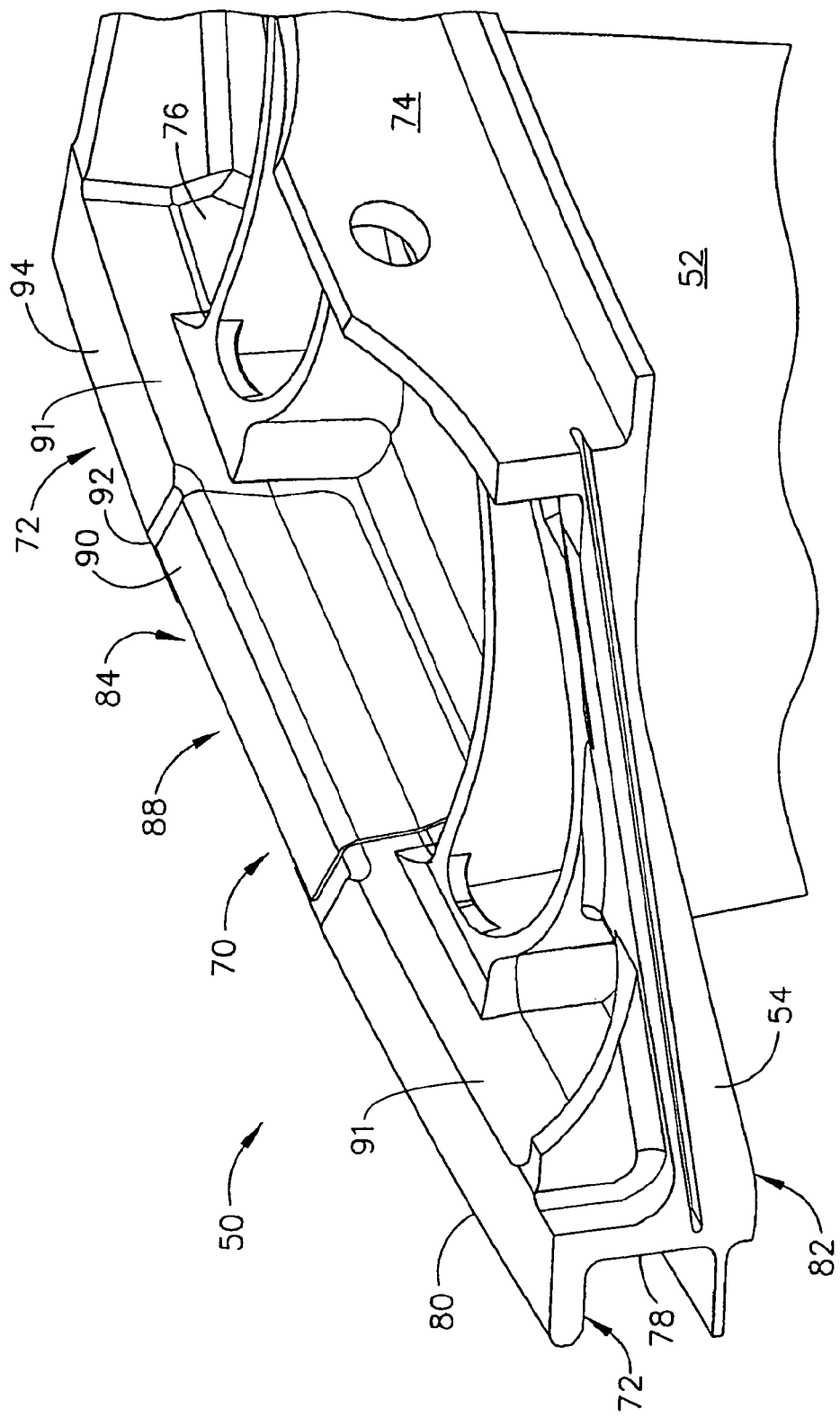
FIG. 3 is a perspective view of a portion of the turbine nozzle shown in FIG. 2.
Figure 4:
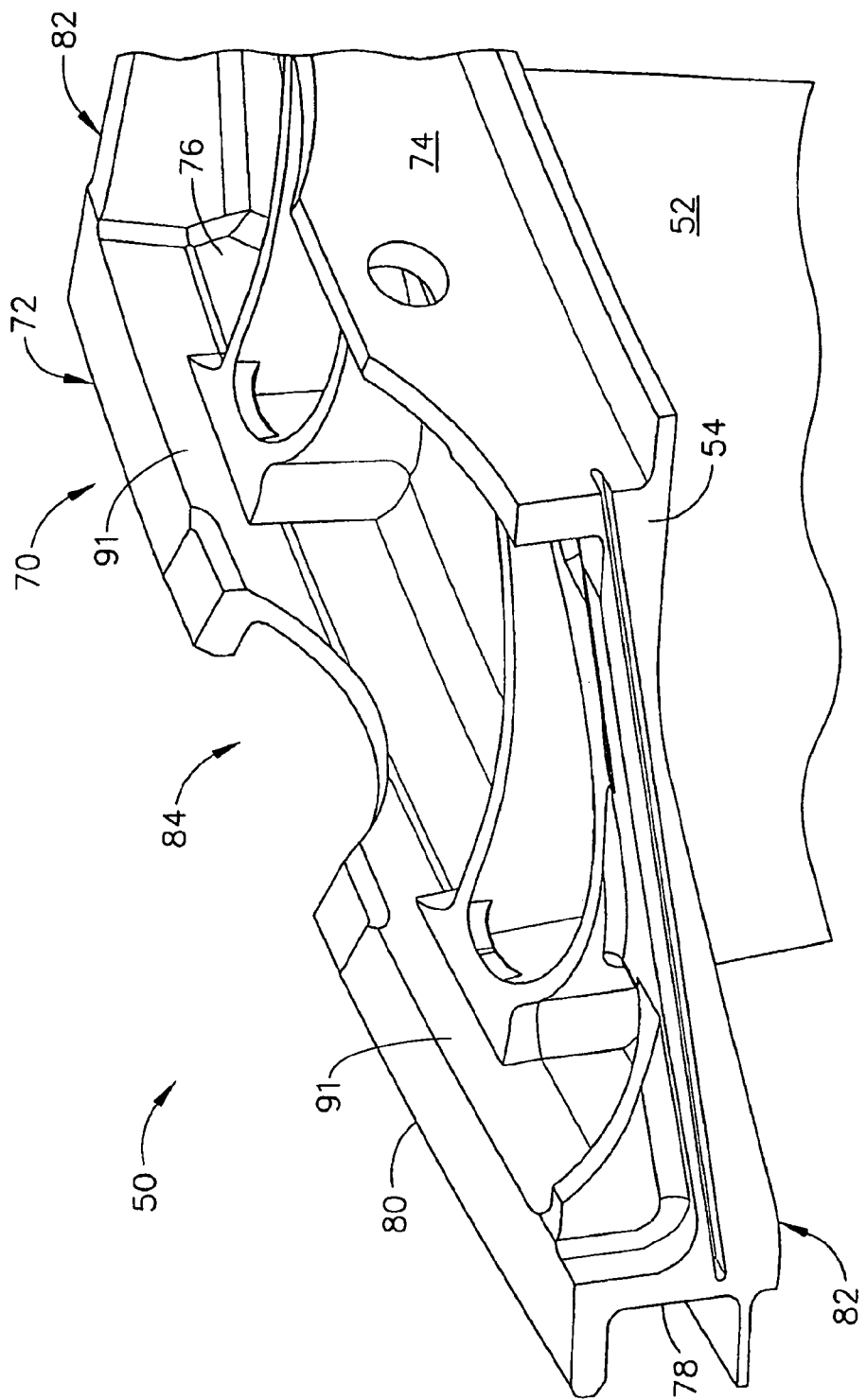
FIG. 4 is another perspective view of a portion of the turbine nozzle shown in FIG. 2.
Figure 5:
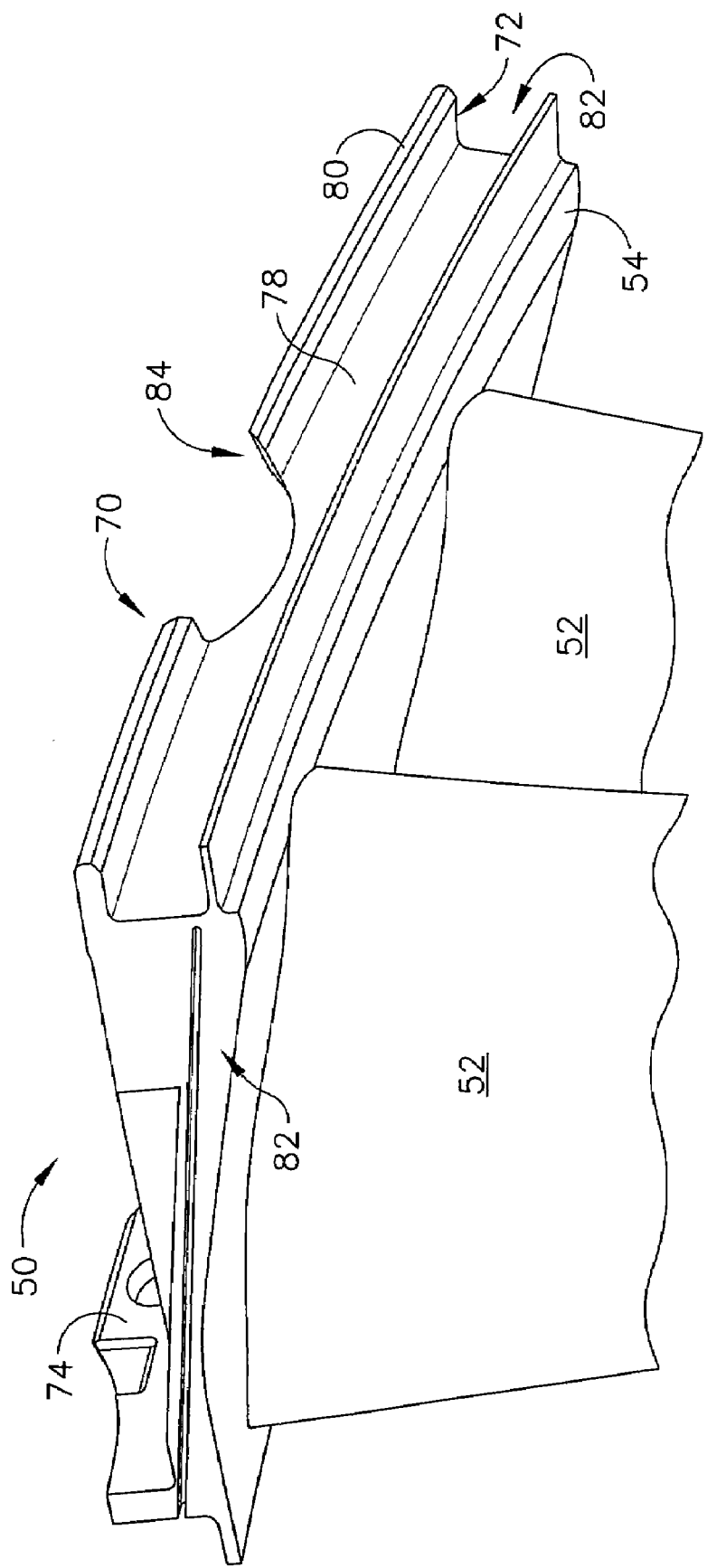
FIG. 5 is another perspective view of a portion of the turbine nozzle shown in FIG. 2.

FIG. 2 is a perspective view of an exemplary embodiment of a turbine nozzle sector 50 that may be used with gas turbine engine 10 (shown in FIG. 1). FIG. 3 is a perspective view of a portion of turbine nozzle sector 50. FIG. 4 is another perspective view of a portion of turbine nozzle sector 50. FIG. 5 is another perspective view of a portion of turbine nozzle sector 50. Nozzle sector 50 includes a plurality of circumferentially-spaced airfoil vanes 52 coupled together by an arcuate radially outer band or platform 54 and an arcuate radially inner band or platform 56. More specifically, in the exemplary embodiment, each band 54 and 56 is integrally-formed with airfoil vanes 52, and nozzle sector 50 includes two airfoil vanes 52. In one embodiment, each arcuate nozzle sector 50 is known as a two vane segment.

Inner band 56 includes an aft flange 60 that extends radially inwardly therefrom. More specifically, flange 60 extends radially inwardly from band 56 with respect to a radially inner surface 62 of band 56. Inner band 56 also includes a forward flange 64 that extends radially inwardly therefrom. Forward flange 64 is positioned between an upstream edge 66 of inner band 56 and aft flange 60, and extends radially inwardly from band 56.

Outer band 54 includes a cantilever mounting system 70 that includes a forward hook assembly 72 and an aft flange 74. Cantilever mounting system 70 facilitates supporting turbine nozzle 50 within engine 10 from a surrounding annular engine casing (not shown). Forward hook assembly 72 extends radially outwardly from an outer surface 76 of outer band 54. Forward hook assembly 72 includes a forward rail 78 and a hook 80. Rail 78 extends radially outwardly from outer band outer surface 76 in a circumferential direction across outer band outer surface 76 and between a pair of oppositely disposed circumferential sector ends 82.

Engine 10 includes a rotor assembly (not shown), such as, but not limited to, a low pressure turbine (not shown), that includes at least one row of rotor blades (not shown) that is downstream from turbine nozzle sector 50. The rotor assembly is surrounded by a rotor shroud (not shown) that extends circumferentially around the rotor assembly and turbine nozzle sector 50. Cantilever mounting system 70 couples each turbine nozzle sector 50 to the rotor shroud through a hanger (not shown) that supports and is coupled to the shroud. More specifically, hook 80 is slidably coupled within a radially outer channel (not shown) defined within the hanger.

Hook 80 does not extend continuously between circumferential ends 82, but rather hook 80 includes one or more scalloped recessed areas 84. Scalloped recessed area(s) 84 may facilitate reducing stresses, such as, but not limited to, mechanical and/or thermal stresses, induced to turbine nozzle sector 50. For example, in some embodiments scalloped recessed area(s) 84 may facilitate reducing stresses induced into an intersection between an airfoil vane 52 and outer band 54. Although one recessed area 84 is illustrated, hook 80 may include any number of scalloped recessed areas 84. Moreover, scalloped recessed area(s) 84 may have any suitable size, shape, orientation, and/or location that facilitates reducing stresses induced into turbine nozzle sector 50, whether such size, shape, orientation, and/or location is described and/or illustrated herein. Accordingly, scalloped recessed area(s) 84 may facilitate increasing an operational life of turbine nozzle sector 50 and/or reducing an amount of cooling air that may be necessary and/or desired to maintain to turbine nozzle sector 50 during operation. In addition, because forward hook assembly 72 is scalloped, an overall weight of turbine nozzle sector 50 is reduced in comparison to other known turbine nozzles that do not include recessed area(s) 84.

One or more seal assemblies 88 is positioned adjacent scalloped recessed area(s) 84. Although one seal assembly 88 is illustrated, turbine nozzle sector 50 may include any number of seal assemblies 88. Although seal assembly 88 may be positioned anywhere to facilitate reducing fluid leakage through a recessed area 84, in the exemplary embodiment seal assembly 88 includes a seal member 90 that extends in sealing contact along a downstream side 91 of hook assembly rail 78 at least partially overlapping scalloped recessed area 84. Moreover, in the exemplary embodiment seal member 90 extends in sealing contact along a radially outer surface 94 of hook 80. Accordingly, seal assembly 88 may facilitate reducing fluid leakage through scalloped recessed area 84. In some embodiments, fluid pressure facilitates maintaining seal member 90 in sealing contact with rail 78 and/or hook 80. Moreover, in some embodiments, seal member 90 is slidably coupled to hook assembly 72 to facilitate sealing contact between member 90 hook assembly 72 during thermal expansion and/or contraction of hook assembly 72. For example, in the exemplary embodiment seal member 90 is coupled to hook assembly 72 for movement within a slot 92 within hook radially outer surface 94. Seal member 90 may be slidably coupled to hook assembly 72 in any suitable fashion, configuration, position, location, orientation, arrangement, and/or by any suitable structure and/or means.

The above-described turbine nozzle includes a scalloped aft forward hook assembly that extends from the forward rail. The hook assembly includes one or more recessed areas that are circumferentially spaced across the outer band. The recessed areas not only reduce an overall weight of the turbine nozzle assembly, but also facilitate reducing mechanical and/or thermal stresses induced to the turbine nozzle. In addition, the turbine nozzle includes a seal assembly that at least partially overlaps a recessed area to facilitate reducing fluid leakage through the recessed area. As a result, the durability and useful life of the turbine nozzle are facilitated to be increased by the combination of the scalloped hook assembly and the seal assembly.

Exemplary embodiments of turbine nozzles are described above in detail. The nozzles are not limited to the specific embodiments described herein, but rather, components of each turbine nozzle may be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a turbine nozzle segment for a gas turbine engine, said method comprising:
    providing a turbine nozzle segment including a plurality of airfoil vanes extending between an inner band and an outer band, wherein the outer band includes a forward hook assembly having a rail and at least one hook that extends substantially axially outwardly from the rail;
    providing at least one scalloped recessed area within the forward hook assembly and the at least one hook, the at least one scalloped recessed area extending towards the inner band to facilitate reducing stresses induced to the turbine nozzle segment; and
    coupling a seal assembly to the forward hook assembly to at least partially overlap the at least one scalloped recessed area such that a flow of fluid through the at least one scalloped recessed area is facilitated to be restricted.

2. A method in accordance with claim 1 wherein said providing a turbine nozzle segment further comprises providing the turbine nozzle segment with an arcuate outer band that includes a leading edge side, a trailing edge side, and a pair of oppositely-disposed outer sides that extend between the leading edge side and the trailing edge side such that the rail extends between the outer sides.

3. A method in accordance with claim 2 wherein said providing at least one scalloped recessed area further comprises providing the at least one scalloped recessed area between the outer sides.

4. A method in accordance with claim 1 wherein coupling a seal assembly to the forward hook assembly comprises a coupling the seal assembly such that the seal assembly is movable with respect to the at least one scalloped recessed area.

5. A turbine nozzle segment for a gas turbine engine, said turbine nozzle segment comprising:
    an inner band;
    an outer band; and
    at least one airfoil vane extending between said inner band and said outer band, said outer band comprising an inside face, an outside face, and a forward hook assembly extending outwardly from said outside face, said forward hook assembly comprising a rail and at least one hook extending substantially axially outwardly from said rail, said at least one hook comprising at least one scalloped recessed area, said at least one scalloped recessed area extending towards said inner band; and
    a seal assembly configured to be coupled to said forward hook assembly to at least partially overlap said at least one scalloped recessed area such that a flow of fluid through said at least one scalloped recessed area is facilitated to be restricted.

6. A turbine nozzle segment in accordance with claim 5 wherein said outer band is arcuate and further comprises an upstream side, a downstream side, and a pair of circumferential outer sides extending between said upstream side and said downstream side, said rail extending between said outer sides, said at least one scalloped recessed area defined between said outer sides.

7. A turbine nozzle segment in accordance with claim 5 wherein said at least one scalloped recessed area facilitates reducing stresses induced to said turbine nozzle segment.

8. A gas turbine engine comprising:
    a compressor assembly;
    a combustor assembly in flow communication with said compressor assembly; and a turbine assembly in flow communication with said combustor assembly, said turbine assembly comprising at least one turbine nozzle assembly comprising an outer band, an inner band, and a plurality of airfoil vanes extending between said inner band and said outer band, said outer band comprising a radially outwardly extending forward hook assembly, said forward hook assembly comprising a rail and at least one hook extending substantially axially outwardly from said rail, said at least one hook comprising at least one scalloped recessed area area extending towards said inner band, wherein said turbine nozzle assembly further comprises a seal assembly configured to be coupled to said forward hook assembly to at least partially overlap said at least one scalloped recessed area such that a flow of fluid through said at least one scalloped recessed area is facilitated to be restricted.

9. A gas turbine engine in accordance with claim 8 wherein said outer band is arcuate and further comprises an upstream side, a downstream side, and a pair of circumferential outer sides extending between said upstream side and said downstream side, said rail extending between said outer sides, said at least one scalloped recessed area defined between said outer sides.

10. A gas turbine engine in accordance with claim 8 wherein said at least one scalloped recessed area facilitates reducing stresses induced to said turbine nozzle assembly.

* * * * *